United States Patent [19]
Kulak et al.

[11] Patent Number: 4,738,091
[45] Date of Patent: Apr. 19, 1988

[54] ROTARY CUTTER SHIELD

[75] Inventors: John Kulak, Port Colborne; David A. Willer, Fonthill, both of Canada

[73] Assignee: Deere & Company, Moline, Ill.

[21] Appl. No.: 8,027

[22] Filed: Jan. 28, 1987

[51] Int. Cl.⁴ .............................................. A01D 75/20
[52] U.S. Cl. ........................................ 56/320.2; 56/17.4
[58] Field of Search .................. 56/320.2, 17.4, 258, 56/320.1

[56] References Cited

U.S. PATENT DOCUMENTS

| | | | |
|---|---|---|---|
| 3,226,920 | 1/1966 | Gilbertson | 56/17.4 |
| 3,369,350 | 2/1968 | Rogers et al. | 56/17.4 |
| 3,391,524 | 7/1968 | Nickoloff et al. | 56/320.2 |
| 3,432,183 | 3/1969 | Groll | 56/17.4 |
| 3,760,572 | 9/1973 | Marion et al. | 56/320.2 |
| 4,135,351 | 1/1979 | Akgulian | 56/255 |
| 4,306,409 | 12/1981 | Wulfers | 56/17.4 |
| 4,315,396 | 8/1982 | Oka et al. | 56/17.2 |

Primary Examiner—Paul J. Hirsch

[57] ABSTRACT

Guard structure for the forward portion of a rotary cutter including a front sill with a formed angle section that is permanently attached to the cutter to provide both protection from the rotary blade and structure for hanging chain links across the width of the front opening to restrict material from being thrown from the front of the cutter. In addition, the angle section strengthens the forward portion of the cutter.

6 Claims, 2 Drawing Sheets

ROTARY CUTTER SHIELD

BACKGROUND OF THE INVENTION

The present invention relates generally to rotary cutters, and more specifically to shields or guards for such cutters.

Existing rotary cutters typically have optional bolt-on chain guards which connect to a structural front sill. Guards are also available to prevent inadvertent contact with the blades of the rotary cutter, but on presently available structures, the guard is a bolt-on strap which normally must be removed when chain shields are installed.

OBJECTS OF THE INVENTION

It is therefore an object of the present invention to provide an improved rotary cutter shield. It is a further object to provide such a shield which prevents inadvertent contact with the rotary blades and also provides structure for holding chain links across the front opening of the rotary cutter.

It is still another object of the invention to provide a guard for preventing contact with the blades of a rotary cutter and which does not have to be removed when chain shields are installed.

BRIEF DESCRIPTION OF THE INVENTION

In accordance with the above objects, a formed angle section front sill is attached to the forward end of a rotary cutter adjacent the front opening. The sill extends outwardly and downwardly from the opening to prevent contact with the rotating blades of the cutter. The sill is apertured to receive hanging chain links across its width to close off the front opening and help restrict material from being thrown out of the front of the cutter.

The chain guard hanger and cutter guard thus provided are non-removable and thereby eliminate the need to remove the guard when a chain guard is attached to the cutter. The structure is also simpler in construction and less expensive to manufacture than most previously available chain guard attachments. The front frame sill provides added strength to the forward portion of the cutter.

These and other objects, features and advantages of the present invention will become apparent to one skilled in the art upon reading the following detailed description in view of the drawings.

DESCRIPTION OF THE PREFERRED EMBODIMENT

Figure 1:
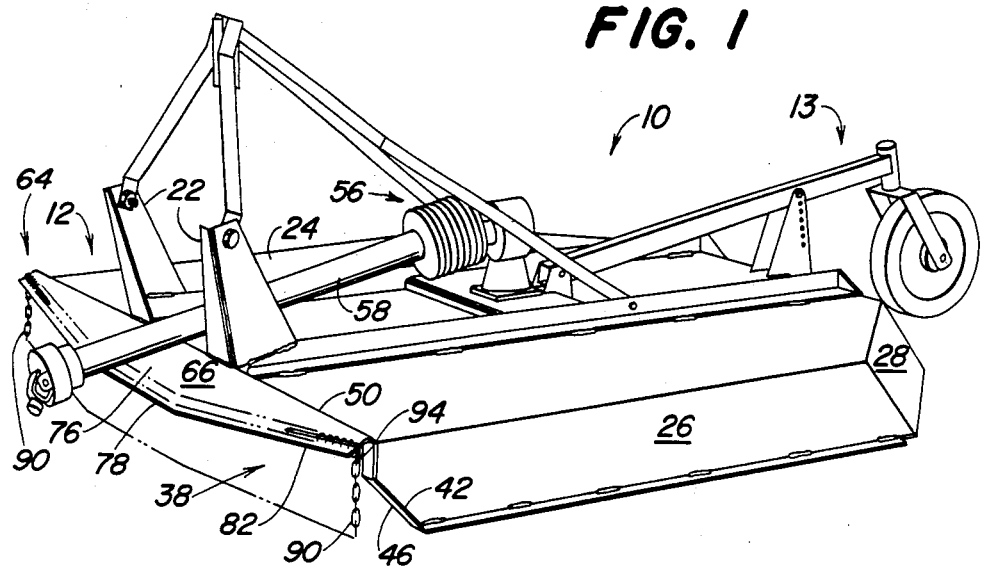
FIG. 1 is a perspective view of a rotary cutter containing the guard of the present invention.

Referring now to FIG. 1, therein is shown a rotary cutter 10 having a main body 12 supported at its aft end by a wheel assembly 13 for towing forwardly over the ground by three-point hitch structure 14 on a towing vehicle (not shown). The hitch structure 14 includes a pair of transversely spaced lower arms 18 connected to corresponding hitch structure 22 at the forward end of the main body 12. As shown in FIG. 1, the main body 12 includes generally horizontal upper deck structure 24 with downwardly projecting side panel structure 26, downwardly and outwardly projecting rear diagonal panel structure 28 connected by a transversely extending downwardly and rearwardly projecting panel 32. The panel structure thus defines a generally downwardly opening compartment area 36 substantially closed around its side and rear, but opening in the forward direction at 38 to allow ingress of the material to be operated upon by the cutter as the towing vehicle moves the cutter 10 forwardly over the field. The side panel structure 26 has a front edge at 42 which is angled downwardly and rearwardly, and ground skids 46 extend rearwardly and downwardly from the front edge, indicated generally as 50. The front edge 50 extends transversely the entire width of the machine over the forward opening 38.

Cutting blades 54 are rotatably mounted in the compartment area 36 and are rotated by conventional drive structure 56 connected by a drive shaft 58 to the PTO on the towing vehicle. As the blades 54 are rotated, the outermost edges of the blades define a circular cutting path, indicated generally as 60. Front guard structure 64 is provided adjacent the forward opening 38 and extends transversely substantially the width of the front edge 50. The guard structure 64 includes a front sill 66 fabricated from a formed angle section. The front sill 66 includes a rear, downwardly directed flange 68 which is connected by welding or other suitable connecting method to the front of the upper deck structure 24 with the upper portion of the flange 68 located adjacent the top of the deck. The front sill 66 is bent downwardly and forwardly at location 74 to define a downwardly and forwardly projecting panel 76 having a forward edge 78 which extends a substantial distance ahead of the circular cutting path 60. The front edge 78 extends transversely (FIG. 1) in an area 80 located generally between the hitch structure 22 which connects to the arms 18 of the tractor three-point hitch structure 14. The edge 78 includes front outer edges indicated generally at 82 which angle slightly rearwardly from the ends of the edge portion 80 which are located below the arms 18.

Figure 2:
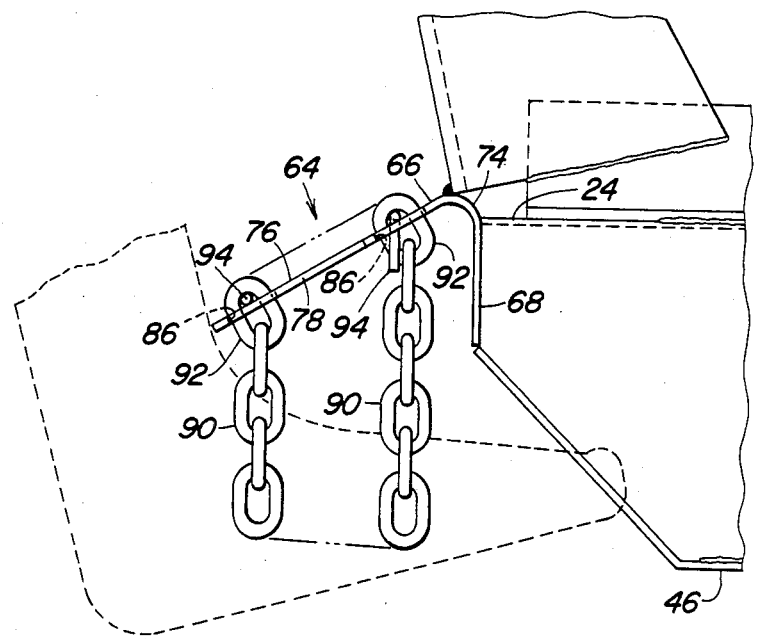
FIG. 2 is an enlarged side view of the area of the cutter of FIG. 1 adjacent the guard.
Figure 3:
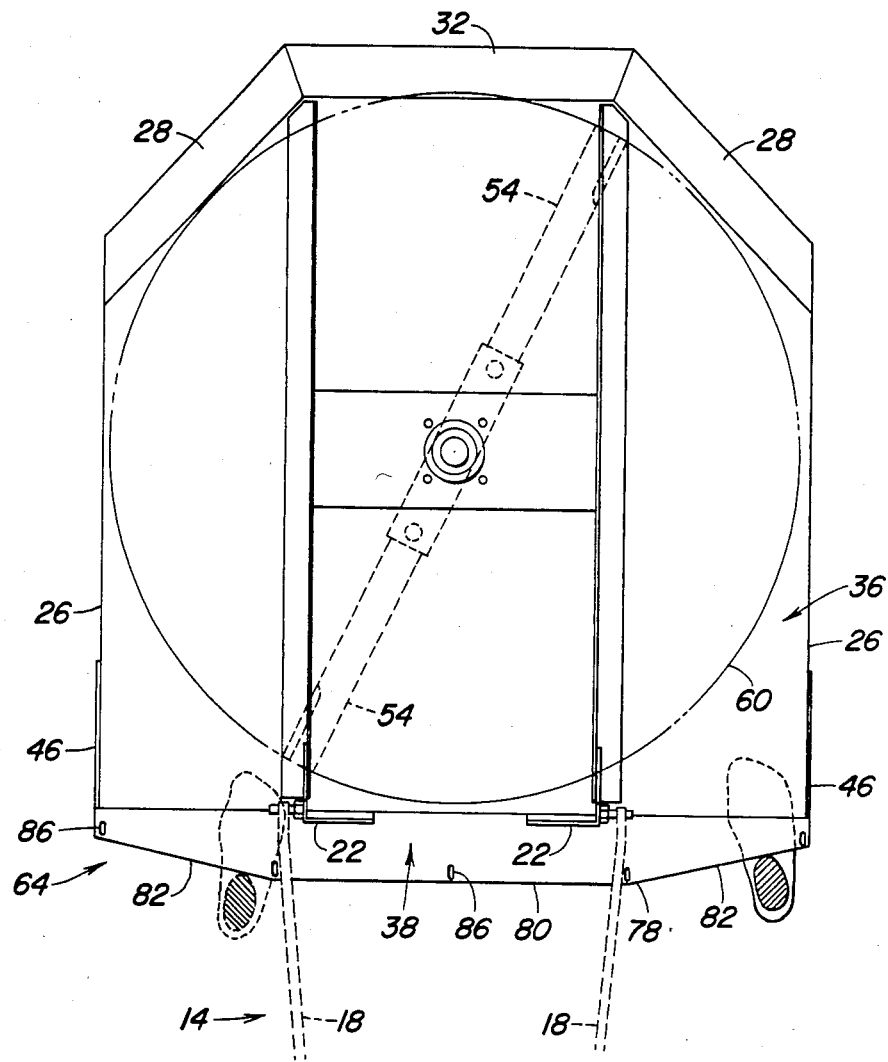
FIG. 3 is a top view showing the general arrangement of the cutter blade and guard of the rotary cutter of FIG. 1.

A series of fore-and-aft extending, link-receiving slots 86 are uniformly spaced across the entire width of the front sill 66 closely adjacent the forward edge 78. Short chain sections 90 are hung from the slots 86 and include upper links 92 which extend through the slots 86 and which are secured to the front sill 66 by rods 94 which extend through the links 92 along the top surface of the sill 66. The chain sections 90 extend down to a level generally even with the skids 46 to restrict material from being thrown through the front opening 38. The front edges 82 prevent inadvertent contact (FIG. 2 and 3) with the rotating blades 54 in an area adjacent the front opening 38 between the lower arms 18 and the side panel structure 26 while permitting material to be cut to freely enter the compartment area 36. The lower arms 18 of the tractor three-point hitch structure 14 provide a barrier in the area of the portion 80 of the forward edge 78.

The formed angle of the front sill 66 strengthens the forward portion of the cutter 10 while it provides built-in protection from inadvertent contact with the blades 54. The sill 66 also provides structure for hanging the short chain sections 90 across the width of the front opening 38.

Having described the preferred embodiment, it will be apparent that modifications can be made without departing from the scope of the invention as defined in the accompanying claims.

I claim:

1. In a rotary mower adapted for movement in the forward direction and having a housing with a top deck, a cutting blade mounted in the housing for rotation about an upright axis, said housing including a portion defining a forward opening below the deck for receiving material to be cut therethrough, guard structure comprising:

a protective panel structure fixed to and extending substantially horizontally from the deck above the opening, said panel structure including a formed angle having an upright flange connected to the deck adjacent the opening for strengthening the housing adjacent the opening and means projecting forwardly from the flange beyond the opening a sufficient distance for providing protection against contact with the blade while permitting the material to be cut to pass thereunder into the housing; and guard means, and means securing the guard means to the protective panel structure for restricting material within the housing from being thrown forwardly from the opening by the rotating blade.

2. The invention as set forth in claim 1 wherein said means projecting comprises an outward edge of the panel structure.

3. The invention as set forth in claim 2 wherein the panel structure is angled downwardly from the deck toward the outward edge, said outward edge located below the deck, but substantially above the ground.

4. The invention as set forth in claim 1 wherein the guard means comprises a plurality of link chains depending from the panel structure.

5. The invention as set forth in claim 4 wherein the panel structure includes a plurality of apertures for receiving a portion of the link chains therethrough.

6. The invention as set forth in claim 1 wherein the formed angle is welded to the deck.

* * * * *